Jan. 26, 1960 E. BRASSEUR 2,922,654

SOUND SUPPORT DRIVING MECHANISM IN A SOUND RECORDING REPRODUCING APPARATUS

Filed Aug. 22, 1955 2 Sheets-Sheet 1

United States Patent Office 2,922,654

Patented Jan. 26, 1960

2,922,654

SOUND SUPPORT DRIVING MECHANISM IN A SOUND RECORDING REPRODUCING APPARATUS

Eudore Brasseur, Mont-sur-Marchienne, Belgium, assignor to Ateliers de Constructions Electriques de Charleroi, Brussels, Belgium, a corporation of Belgium Application August 22, 1955, Serial No. 529,732

Claims priority, application France January 17, 1955

9 Claims. (Cl. 274—11)

The present invention relates to improvements in sound recording and reproducing devices in which an elongated sound track receiving or bearing is intermittently advanced with a step-by-step movement and the recording and reproducing head moves in alternately reverse directions generally across the record during the periods of rest of the record.

The invention is particularly applicable to sound recording and reproducing devices of the electro-magnetic type, in which the record incorporates at least a layer of magnetizable material responsive to the head so as to form a sound track on the record when the device is recording and to play back the sound from the sound track when the device is reproducing. Such sound track is of a zigzag shape with parallel main runs of the sound track extending generally transverse to the length of the record and spaced from each other, such main runs being connected at their ends by short portions extending parallel to the length of the record, the main transverse portions of the sound track being formed by the head during the periods of rest of the record, and the other shorter portions thereof being formed during movement of the record.

In prior devices of this type, the record is advanced by rotatable driven rollers having teeth which engage in notches extending longitudinally of the record. In such prior record-advancing mechanism the record is simultaneously engaged by only a few teeth on the rollers, the rollers themselves being insufficient to function as the sole guide for the record, so that other record-guiding means must be provided.

In accordance with the present invention, the mechanism for advancing the record incorporates two worm gears, one at each side of the record at the recording and reproducing zone, such worm gears lying with their axes generally in the plane of the record and parallel to the longitudinal edges thereof, the worm gears engaging a series of uniformly spaced notches on each edge of the record. The worm gears are of sufficient length, and are so located with respect to the recording and reproducing zone of the device that in addition to feeding the record past the recording and reproducing zone, they also function to guide it accurately in a longitudinal direction. The device of the invention also incorporates mechanism for turning the two worm gears through equal angular increments and for retaining them accurately in position during the periods of rest of the record. Additionally, the worm gears for feeding the record are of such structure that when they are turned to either one of two predetermined initial angular positions, a record may be easily mounted on them in the correct starting position. The device also incorporates a mechanism whereby the record-feeding worm gears may be initially brought into a correct angular position for initially engaging a record.

Preferably, the device of the invention incorporates means whereby the record may be adjusted longitudinally with respect to the path of the sound recording and reproducing head, whereby the sound track on the record may be brought into accurate registry with the path of such head.

The sound recording and reproducing device of the invention is particularly described below in conjunction with the accompanying drawings, in which.

Figure 3A:
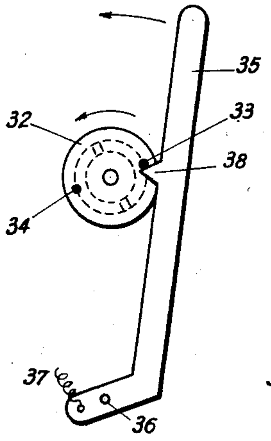
Figure 3B:
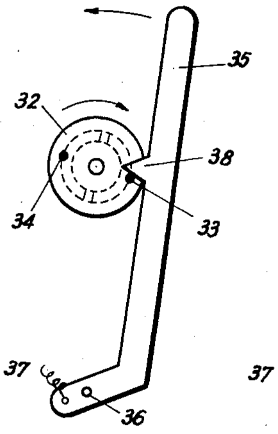
Figure 3C:
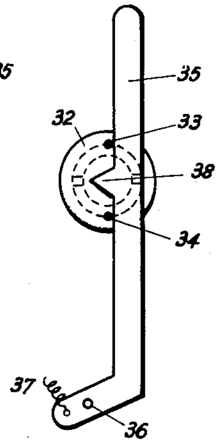
Figure 4A:
Figure 4B:
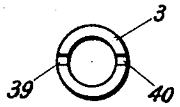

Figs. 3*a*, 3*b*, and 3*c* are fragmentary views in end elevation of the mechanism whereby the record-feeding worm gears are brought into the correct starting position, Figs. 3*a* and 3*b* showing respectively, two different modes of initial interaction between the parts of such mechanism, and Fig. 3*c* showing the terminal position of the parts of the mechanism;

Fig. 4*a* is a view in side elevation of one of the record-feeding worm gears of the device;

Fig. 4*b* is a view in end elevation of the worm gear of Fig. 4*a*; and

Figure 5:
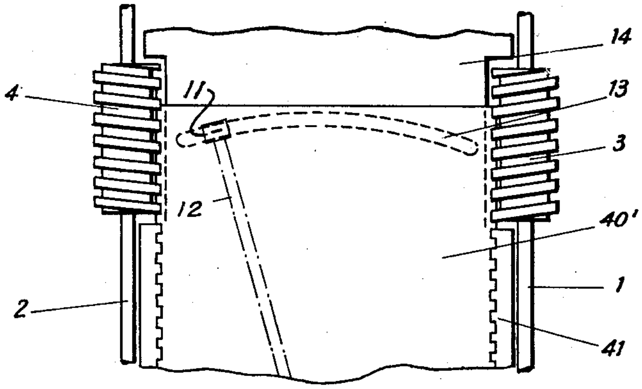

Fig. 5 is a fragmentary view in plan of the device having a sound track bearing or receiving record mounted thereon.

Figure 1:
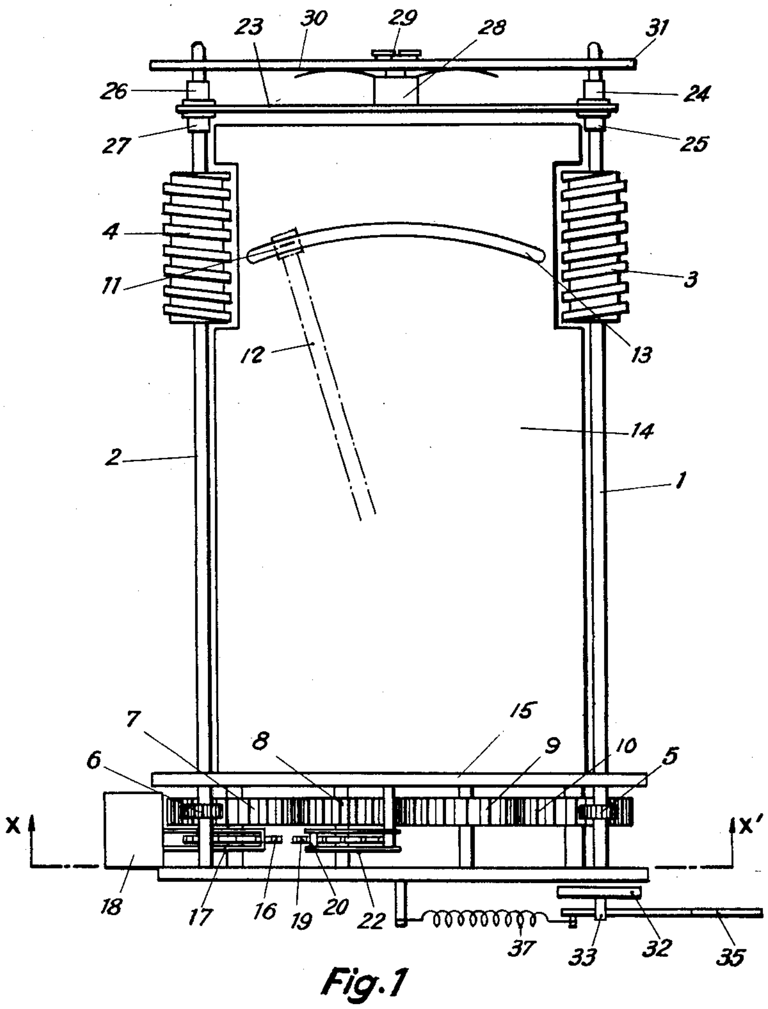
Fig. 1 is a diagrammatic fragmentary view in plan of the device.

In Fig. 1, there is shown a portion of a sound recording and reproducing device of a presently preferred embodiment of the invention. Such device incorporates a horizontal record-supporting table 14 having an arcuate slot 13 therein disposed generally transverse to the length of the table. An electro-magnetic sound recording and reproducing head 11, located beneath table 14 and connected to the end of arm 12; is affixed to a vertical shaft, not shown, so as to oscillate between terminal positions at the ends of the slot 13. An elongated sound track receiving and bearing record 40′ (Fig. 5), incorporating at least a layer of magnetic material, is adapted to lie upon the table 14, as shown, and to be driven by means to be described with a step-by-step movement past the slot 13 in the table and longitudinally of the record. Each movement of the record occurs immediately after the head 11 has reached one to its termini. Preferably, the record-advancing means is under the control of the means for oscillating the sound head 11 and its arm 12. The means for controlling feeding of the record by the oscillation of the sound head may be, for example, the mechanism shown in the related U.S. application Serial No. 529,609, filed of even date, which corresponds to French patent application Serial No. 683,707, filed January 17, 1955.

As a result of the described relative movements of the record and the recording and reproducing head when the device is recording sound, the head creates a zigzag sound track upon the record, such sound track being composed of a series of parallel arcuate runs lying generally transverse to the length of the record, successive runs of the sound track being connected by short runs along the sides of the record and lying parallel thereto.

As shown, the two record-advancing worm gears 3 and 4, which are preferably of opposite hand, are disposed on shafts 1 and 2, respectively, which extend along opposite sides of the table 14 with their axes lying substantially in the plane of the upper surface of the table. The worm gears are so disposed relative to the slot 13 in the table that such slot, which coincides with the path of travel of the sound head, lies substantially centrally between the transverse projections from the ends of the worm gears. As a result, the record is accurately guided by the worm gears for straight line movement generally across the path of movement of the sound head, and is engaged by a substantial number of lands of the worm gears, which extend into the notches 41 along the opposite edges of the record. Even at the starting position of the record, shown in Fig. 5, the record is engaged at its starting end by at least one land of each worm gear lying generally in advance of the path of movement of the sound head.

Figure 2:
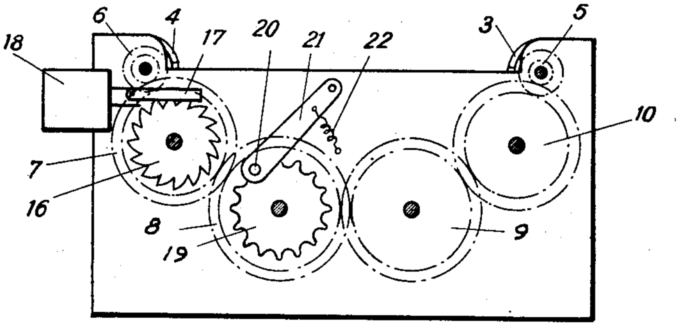
Fig. 2 is a view in vertical section through the device, the section being taken along the line X—X′ of Fig. 1.

The worm gears 3 and 4 are preferably of the opposite hand, as shown, and are rotated in opposite directions to advance the record. In the preferred embodiment shown, the worm gear 4 is advanced clockwise (Fig. 2) and the worm gear 3 is rotated counterclockwise, so that they tend to press the record 40′ against the supporting table 14. The means for connecting the shafts 1 and 2 of the respective worm gears 3 and 4 together is indicated in Figs. 1 and 2. As there shown, such means consists of the pinion 5 attached to shaft 1, and the similar pinion 6 attached to shaft 2, such pinions meshing with the respective similar gears 10 and 7, respectively, which in turn mesh with the central similar mutually meshing gears 9 and 8, respectively. All of such pinions and gears are located within an end housing shown at the lower end in Fig. 1. To allow the gears 3 and 4 to be adjusted endwise by a means to be described, the ends of shafts 1 and 2 bearing the pinions 5 and 6 are slidable to a certain extent in their bearings in the walls of the housing, the pinions 5 and 6 being thinner than the gears 10 and 7 so that meshing engagement is preserved between the pinions and gears despite longitudinal adjustment of the shafts 1 and 2.

The train of gears connecting shafts 1 and 2, and thus the worm gears 3 and 4, is intermittently rotated by means of the ratchet wheel 16 which has the pawl-like member 17, actuated by the solenoid 18, cooperating therewith. When the plunger of the solenoid is urged to the left by energization of the solenoid coil, the member 17 acts upon the ratchet wheel 16 to rotate the ratchet wheel and thus the gear 7 one step counterclockwise (Fig. 2). Then the coil of solenoid 18 is de-energized, the plunger of the solenoid and thus the member 17 are urged to the right by a spring means (not shown). In such latter position of member 17 it exercises no positioning function upon the ratchet wheel 16.

To insure that the gear train and thus the worm gears 3 and 4 are successively turned through a uniform angle and are accurately held in position during each period of rest of the record, there is provided a worm gear-indexing means cooperating with the gear train in a manner more clearly shown in Fig. 2. As there shown, a sprocket-like member 19 is affixed to the shaft carrying the gear 8 so as to rotate with such gear. Member 19 is provided with a series of uniformly spaced teeth having valleys therebetween equalling in number the operative ratchet teeth on member 16 and spaced a distance substantially determining the distance between successive portions of the sound track disposed transversely of the record. Cooperating with the member 19, there is a roller 20 mounted on the free end of lever 21 which is pivoted at its upper end to a wall of the gear housing. A spring 22 acting between a fixed wall of the housing and the lever 21 constantly urges the roller 20 against the periphery of member 19 so that the roller rides up on the teeth and down into the valleys on the latter member. The member 19 is so positioned relative to gear 8, and the lever 21 is so located that the roller 20 lies stably within a valley on member 19 after the plunger of the solenoid 18 has completed a record-advancing stroke.

In order to provide the before-mentioned adjustment of the worm gears 3 and 4 longitudinally of the table 14, and thus to provide adjustment of the longitudinal positioning of the record 40′ with respect to the path of the sound head 11, the ends of shafts 1 and 2 remote from the gear housing are supported in a subframe member 23 which is adjustable longitudinally of the table 14. The shafts 1 and 2 extend through member 23 and carry, respectively, pairs of thrust bearings 24, 25 and 26, 27 on opposite sides of member 23 to retain the shafts against reciprocation with respect to member 23. Member 23, and thus the shafts 1 and 2 and the worm gears 3 and 4, may be adjusted longitudinally of the table 14 by means of a central nut 28 affixed to member 23, the nut receiving the threaded inner end of a shouldered screw 29 which extends inwardly through a central opening in a fixed frame member 31. A spring blade 30, having central opening receiving the screw 29 therethrough, is disposed between the inner surface of the frame member 31 and the outer end of the nut 28, thereby to eliminate play between members 23 and 31. It will be apparent that when the screw 29 is screwed into nut 28, the shafts 1 and 2 and thus the worm gears 3 and 4 and the record 40′ which they may engage will be adjusted upwardly as shown in Fig. 1, and that when the screw 29 is unscrewed from nut 28, the worm gears 3 and 4 and the record 40′ will be adjusted downwardly as shown in Fig. 1 with respect to the path of movement of the sound head 11.

In order that the record 40′ may be initially accurately guided by the worm gears 3 and 4 at the start of a recording or sound-reproducing operation, the pitch of the notches along the edges of the record 40′, and the pitch of the screws or worm gears 3 and 4 meshing therewith, are made to be an even multiple of the distance separating two successive transverse ways of the sound track as recorded on the record.

The entering, lower ends (Figs. 1 and 5) of the worm gears 3 and 4 are provided with two diametrically opposed slots 39 and 40, which preferably extend longitudinally of the worm gears for generally half the length of the gears. The record 40′ is initially mounted on the machine by manually turning the gear train connecting the worm gears so that either the slots 39 or the slots 40 on each lie horizontally and confronting each other across the surface of table 14. When the worm gears are thus positioned, the record 40′ may be initially positioned with its entering end in advance of the worm gears (Figs. 1 and 5), and the record may then be slid into confronting longitudinal slots in the worm gears until the entering end of the record abuts the first unslotted land of each worm gear. When the record has thus been mounted on the device, it will be correctly positioned for a sound-reproducing operation.

In order to turn the worm gears 3 and 4 so that either set of slots therein is in position to receive a record, the device is provided with a worm gear orienting means shown in Figs. 1, 3*a*, and 3*c*. Affixed to the outer end of shaft 1 beyond the gear housing is the wheel-like disc 32 carrying two diametrically opposed studs 33 and 34 projecting parallel to the shaft 1. Cooperating therewith is a lever 35 pivoted at 36 on the outer wall of the gear housing and constantly biased away from member 32 by coil tension spring 37. On the side of lever 35 confronting the member 32 is the triangular-pointed dog or finger 38 so positioned as to lie centrally between studs 33 and 34 when the lever 35 is urged to contact both such studs as shown in Fig. 3*c*.

We will assume that when slots 39 in worm gears 3 and 4 lie confronting each other in record-receiving position, stud 33 will lie above stud 34 in the terminal position of lever 35 shown in Fig. 3*c*, and that when slots 40 in worm gears 3 and 4 lie in such record-receiving position, stud 34 will lie on top.

To play back a record on the machine, with the parts of the machine at rest, the operator advances lever 35 in the direction of the arrow in Figs. 3*a* and 3*b*. In same rest positions of the apparatus the stud 33 will initially contact the upper edge of finger 38 on the lever 35, as shown in Fig. 3*a*, and in the other rest positions the stud 33 will initially contact the lower edge of finger 38, as shown in Fig. 3*b*. Continued counterclockwise advance of the lever 35, under such first conditions, will rotate member 32, and thus shaft 1, counterclockwise to the terminal position shown in Fig. 3*c*. In such first terminal position the record-receiving slots 39 confront each other. Under the second conditions, continued advance of lever 35 will rotate member 32 and shaft 1 clockwise to a second terminal position, similar to that shown in Fig. 3*c*, but with the stud 34 lying above the stud 33.

In such second terminal position, the record-receiving slots 40 confront each other. We have seen that, in the embodiment shown, the record will be correctly positioned whether it is intially engaged in slots 39 or slots 40. It will be under stood that within the scope of the invention numerous variations as to details may be made. Thus, if it is also desired alternatively to drive the record in a direction opposite from that above described, the device may be further provided with a second ratchet wheel and solenoid device acting in a direction opposite parts 16 and 18, respectively, and connected, for example, to the gear 10. Further, in some instances it may be desired to provide further means for maintaining the record 40′ stably on the table 14. For this purpose, a lid (not shown) covering the sound recording and reproducing zone and resting upon the record to press it against the table may be provided. Also, it is to be understood that the record 40′ may be either in the form of a card or of a very long strip. In the latter case, the record may be advantageously supported on record supply and take-up reels disposed at the respective ends of the device.

While a preferred embodiment has been shown by way of example in the drawings and particularly described, it will be understood that the invention is in no way limited to this single embodiment.

What I claim and desire to secure by Letters Patent is:

1. In an electro-magnetic sound recording and reproducing device adapted to receive an elongated record having parallel longitudinal edges with a series of uniformly spaced indentations along each edge, the improvement which comprises a central support for the record at the recording and reproducing zone of the device, a worm gear at each side of the support at the recording and reproducing zone lying substantially parallel to the record-engaging surface of the support, said worm gears being adapted to engage the indentations on the respective edges of the record, parallel shafts carrying the respective worm gears, means connecting the parallel shafts and rotating them intermittently to rotate the worm gears in a record-advancing direction, and means mounting the shafts and worm gears for axial adjustment, whereby the position of the record at the recording and reproducing zone may be adjusted.

2. In a sound recording and reproducing device according to claim 1, in which the shafts have a sliding connection with the means connecting them together and driving them and in which there is another shaft and an adjusting means cooperating with said shafts remote from said shaft connecting means.

3. A sound recording and reproducing device according to claim 2, in which the shafts are rotatably supported by a sub-frame member adjustable on the device in a direction longitudinal of the record support, and means for maintaining the shafts from reciprocation relative to the sub-frame member.

4. An electro-magnetic sound recording and reproducing device comprising an elongated record having substantially parallel longitudinal edges, a series of uniformly spaced indentations on opposite longitudinal edges of the record, a central support for the record at the recording and reproducing zone of the device, and means for moving the record longitudinally step-by-step and for guiding it, said means being positioned adjacent of the longitudinal edges of the record tangential thereto and, comprising a record indentation engaging elongated worm gear at each side of the record positioned substantially at the recording and reproducing zone and each having all its worm-wheel teeth engaging the record, each worm gear having sufficient length to effectively guide the record, and means connecting the worm gears and for rotating them intermittently in a record-advancing direction, whereby the record is advanced smoothly and accurately positioned.

5. In a sound recording and reproducing device wherein a sound track receiving means is moved step-by-step past a recording and reproducing zone and a sound head is moved in successive reverse directions generally transverse to the direction of movement of the sound track receiving means and is moved in reverse directions during periods of rest of the sound track receiving means the sound track receiving means comprising an elongated record having a series of uniformly spaced indentations on opposite longitudinal edges of the record, the improvement which comprises means for advancing the record longitudinally and smoothly in successive step-by-step movements past the recording and reproducing zone and for guiding the record during its longitudinal movement comprising, an indentation engaging worm gear disposed at each of said opposite edges of the record and each elongated worm gear having all its worm-wheel teeth engaging the record indentation, each worm gear having sufficient length to effectively guide the record, and means connecting the worm gears and for rotatively driving them intermittently in a record-advancing direction.

6. A sound recording and reproducing device according to claim 5, in which each of the worm gears has a longitudinally extending axial slot at the entering end thereof for receiving the leading end of the record, the slots being so positioned that they correctly initially position a record on the device.

7. A sound recording and reproducing device according to claim 6, including a pair of parallel shafts one each connected to each of said gears and rotatively driven by said driving means, and in which there is a means connected to the driving means for the shafts for bringing the worm gears into the correct angular position to receive the edge of the record at the entering end thereof.

8. A sound recording and reproducing device according to claim 5, including a pair of parallel shafts one each connected to each of said gears and rotatively driven by said driving means, and in which each worm gear has two axial record-receiving slots displaced 180° apart at the entering end of the worm gear, and including a wheel-like member connected to the driving means for the shafts, said wheel-like member having two studs spaced 180° apart and projecting from a side surface thereof parallel to the axis of the wheel-like member, and a detent lever having a finger adapted to selectively contact the opposite sides of each of the studs when the means for advancing the record of the device is manually rotatively driven, the lever having a main body portion adapted to lie alongside the wheel-like member and to contact both studs positively to orient the worm gears so that a selected slot on each worm gear is brought to the record-receiving position wherein the two selected slots confront each other.

9. A sound recording and reproducing device according to claim 5, further including means connected to both worm gears for bringing them into and holding them in accurate indexed position at the end of each record-advancing rotation, in which the means for accurately indexing the worm gears comprises a rotatable sprocket-like member having teeth with valleys between the teeth and being connected to rotate with the worm-gears, a reciprocable roller held against rotation with the member and having its axis substantially parallel to the axis of the member, the roller riding on the periphery of the member, means constantly urging the roller strongly against the member, whereby the roller stably holds the member in indexed position when it lies in a valley on the member, and the distance between the valleys comprising a predetermined distance determining the spacing between successive portions of the sound track disposed transversely of the record.

References Cited in the file of this patent

UNITED STATES PATENTS

| | | |
|---|---|---|
| 462,687 | Bruening | Nov. 16, 1891 |
| 2,124,673 | Puma | July 26, 1938 |
| 2,326,332 | Clausen | Aug. 10, 1943 |
| 2,642,281 | Buhrendorf | June 16, 1953 |
| 2,657,062 | Meunier | Oct. 27, 1953 |
| 2,798,725 | Marshall | July 9, 1957 |

FOREIGN PATENTS

| | | |
|---|---|---|
| 289,446 | Great Britain | Nov. 22, 1928 |